Patented Mar. 16, 1954

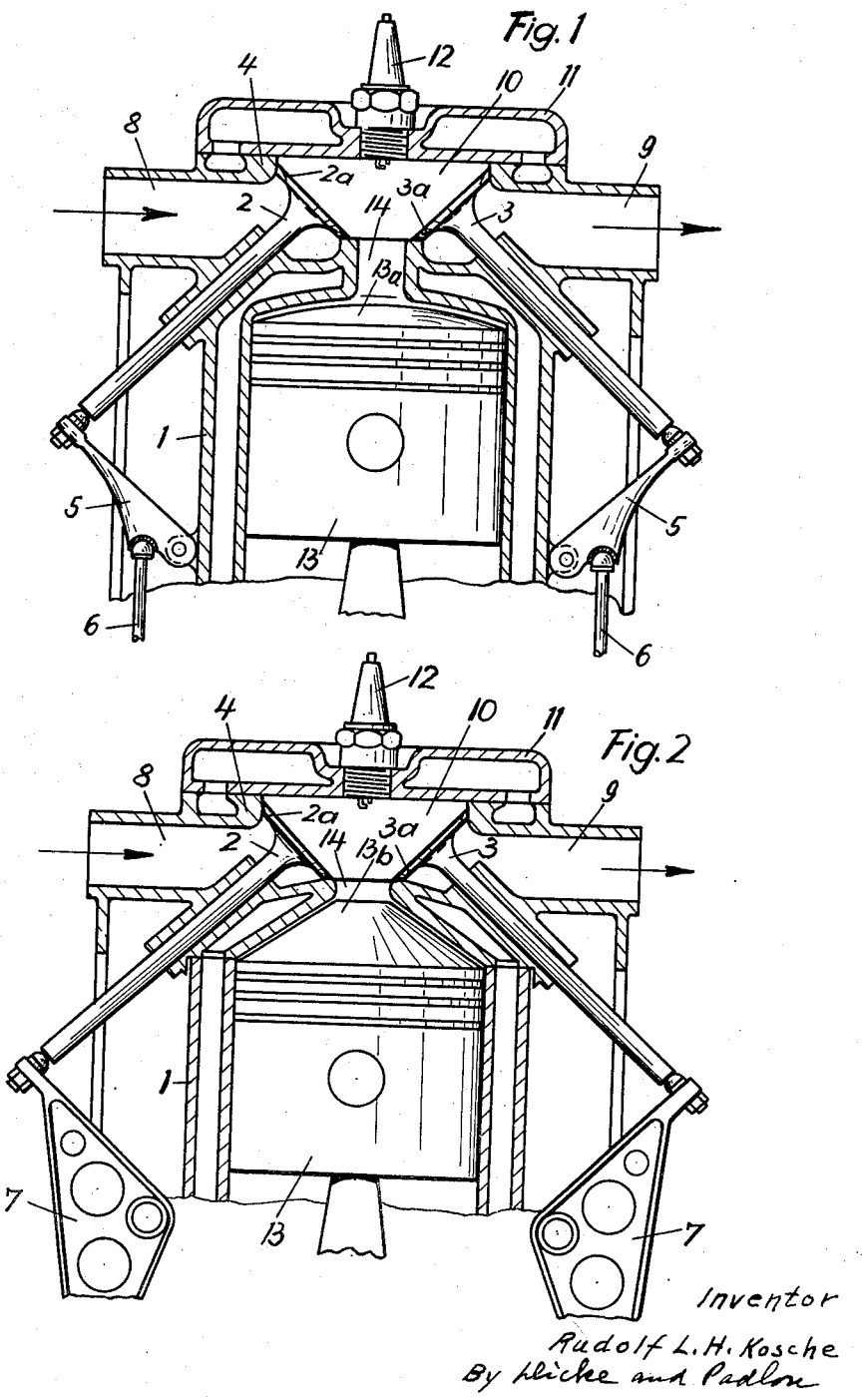

2,672,135

UNITED STATES PATENT OFFICE 2,672,135

INTERNAL-COMBUSTION ENGINE

Rudolf L. H. Kosche, Stuttgart-Unterturkheim, Germany, assignor to Daimler-Benz Aktiengesellschaft, Stuttgart-Unterturkheim, Germany Application August 2, 1950, Serial No. 177,204
Claims priority, application Germany August 3, 1949

6 Claims. (Cl. 123—191)

The invention refers to an internal combustion engine, particularly of the mixture compression and spark plug ignition type.

An object of the invention is to provide a form of the combustion chamber, which is favorable for combustion and scavenging.

A further object of the invention is to form the inlet and exhaust canals in such a manner as to minimize the flow resistance for the gases flowing to and fro and to provide the most favorable form of the combustion chamber so that a particularly effective scavenging results.

A further object of the invention is to provide a simple design of the engine casing as well as any easy accessibility to the combustion chamber and to the valves, so that the valve grinding can be done without the necessity of removing the cylinder head, which contains the valves.

Further objects of the invention relates to suitable and simple means for operating of the valves, to an advantageous arrangement of the spark plug and further details of the engine.

It is a characteristic of the invention that the combustion space has a shape, which is for the main part entirely or partially spherical, suitably, however, hemispherical, which connects with the cylinder space through a restricted throttling passage, and that the valves are arranged in inclined position beside the cylinder and approximately radially to the walls of the combustion chamber.

The combustion chamber and valves are for the main part arranged symmetrically to the cylinder on opposite sides of the cylinder.

According to a further characteristic of the invention, the combustion chamber is constructed in hemispherical shape and the base thereof is formed by a cover which is located on the side of the combustion space away from the cylinder space and the restricted throttling passage between the cylinder space and the combustion chamber. This cover is removable and is suitably water-cooled.

According to a further characteristic of the invention inlet and exhaust canals are preferably perpendicular to the cylinder axis, whereby they are arranged opposite each other in alignment. Furthermore the piston is advantageously provided with a displacing head, which closely approaches the combustion wall of the cylinder head between cylinder space and combustion chamber, so that practically the entire compressed air is pushed into the combustion space. According to a further characteristic of the invention, when the combustion space is hemispherical, the spark plug (or in the case of a Diesel engine an injection nozzle) is arranged in the center of the hemisphere.

Further characteristics of the invention are to be taken from the following description of two examples of construction.

Each of the diagrams shows a water-cooled, mixture compressed combustion engine with hemispherical combustion chamber in axial section, i. e.:

Figure 1 shows a combustion engine as described, in which the cylinder jacket and cylinder head are of one piece, and Figure 2 shows a combustion engine as described, in which cylinder jacket and cylinder head are formed separately.

In both examples of construction, 1 designates the water-cooled cylinder, 2 the inlet and 3 the exhaust valve. The valves are arranged symmetrically and inclined to the cylinder axis. In the example of construction in accordance with Figure 1 the valves are controlled by means of a short tappet 6 and of a rocking lever 5, and in the example of construction in accordance with Figure 2 immediately through the rocking lever 7. The inlet and exhaust canals 8 and 9 are formed as straight canals and are located opposite each other in alignment on opposite sides of the combustion chamber 10. The combustion chamber 10 has a hemispherical shape, which is complemented at the valve passages by the concave bottoms 2a, 3a of the disc valves 2 and 3. The base of the hemispherical shape is formed by a plain cover 11, which is fixed on the cylinder head 4 in both examples of construction. The cover 11 is water-cooled as well. It carries the spark plug 12 at its center and is therefore at the center of the sphere of which the combustion chamber walls 10 form a part.

The working piston 13 can for example either, as in the example of construction in accordance with Figure 1, be slightly vaulted (13a) or, as in the example of construction in accordance with Figure 2, be provided with a conical displacing head (13b). In the latter case the throttling passage 14 between the combustion chamber 10 and the working space of the piston can be kept relatively short.

For the grinding of the valves it is necessary to take the cover off. Upon removal of same the combustion chamber as well as the valves are freely accessible from above.

Instead of a spherical or hemispherical combustion chamber also a combustion chamber of elliptic, semi-elliptic, conical or similar shape can be utilized.

It will be noted that the constructions shown and described will serve admirably to accomplish the objects stated above. It is to be understood, however, that the constructions disclosed above are intended merely as illustrative of the invention and not as limiting as various modifications therein may be made without departing from the invention as defined by a proper interpretation of the claims which follow.

What I claim is:

1. An internal combustion engine having a cylinder chamber with a piston reciprocating therein, and having a combustion chamber separated from the cylinder chamber and situated essentially in the direction of the extended cylinder axis above the cylinder chamber, and also having a throttle channel discharging approximately centrally into the conbustion chamber and connecting the cylinder chamber with the said combustion chamber, the combustion chamber having approximately a hemispherical shape the base of which is opposite the throttle channel, an ignition device approximately in the center of said base, and at least one valve lying obliquely alongside the cylinder chamber, the valve axis being directed at an acute angle to the cylinder axis substantially towards the ignition device and the valve disc limiting the approximately spherical part of the combustion chamber alongside the throttle channel.

2. An engine in accordance with claim 1 in which the base of the combustion chamber is formed by a housing cover having plane separating surfaces forming the limiting wall of the combustion chamber.

3. An internal combustion engine in accordance with claim 1, including a second valve, the valve bottoms forming parts of the spherical limitation surface of the combustion chamber and the axes of the valves being inclined to the cylinder axis in such a manner that they intersect each other approximately in the center of the hemisphere which forms the combustion chamber.

4. An internal combustion engine, comprising an engine casing, which contains a cylinder space for a piston moving in it to and fro, a combustion chamber on that side of the cylinder space which is opposite to the crankshaft, and which combustion chamber is connected to the cylinder space by a throttling passage which runs in general in the direction of the cylinder axis, two valves limiting the combustion chamber on both sides of the throttling passage with reference to the cylinder axis, lying opposite each other and inclined to the cylinder axis under such an angle that their axes intersect each other on the side which is opposite to the throttling passage, and furthermore comprising a cover which limits the combustion chamber on the side which is opposite to the throttling passage and the valves, so that after removal of same the combustion chamber and the valves are openly accessible from the outside.

5. An engine in accordance with claim 4 with valve canals for the two valves in the cylinder casing and located opposite to each other and in which the surface of the cover closing the combustion chamber is further removed from the crankshaft than the distance of the valve canals from the crankshaft and in which the said surface extends substantially over the entire combustion chamber.

6. An internal combustion engine comprising an engine casing having a cylinder space therein for a piston moving to and fro and a combustion chamber in the cylinder head of the engine casing, the cylinder space and the combustion chamber being connected by a throttle passage, the chamber having for the main part a hemispherical shape the base of which is opposite the throttle passage while the spherical portion thereof is in general concentrically adjacent to the throttle passage, and a removable cover for the engine casing, which cover forms the limiting surface of the combustion chamber, whereby after the removal of the cover the combustion chamber is freely accessible as a hemispherical recess in the cylinder head of the engine casing, the construction being further characterized by two valves which are arranged inclined beside the cylinder space approximately radially to the spherically shaped part of the combustion chamber, and with a spark plug which is arranged approximately at the center of the spherically shaped part.

RUDOLF L. H. KOSCHE.

References Cited in the file of this patent

UNITED STATES PATENTS

| Number | Name | Date |
| --- | --- | --- |
| 1,414,384 | Tartrais | May 2, 1922 |
| 1,508,722 | Price | Sept. 16, 1924 |
| 1,521,440 | Foster | Dec. 30, 1924 |
| 1,529,059 | Frey | Mar. 10, 1925 |
| 1,531,298 | Manville | Mar. 31, 1925 |
| 1,859,693 | Buchi | May 24, 1932 |